Feb. 25, 1969

E. J. WIECEK 3,429,421

CONVEYOR SYSTEMS

Filed March 31, 1967

Sheet 1 of 3

INVENTOR
EUGENE JOHN WIECEK
BY
Phillip A. Weiss
ATTORNEY

Feb. 25, 1969 E. J. WIECEK 3,429,421

CONVEYOR SYSTEMS

Filed March 31, 1967

United States Patent Office 3,429,421
Patented Feb. 25, 1969

3,429,421

CONVEYOR SYSTEMS

Eugene J. Wiecek, 409 W. Nawata Place,
Prospect Heights, Ill. 60070

Filed Mar. 31, 1967, Ser. No. 627,510
U.S. Cl. 198—179 7 Claims
Int. Cl. B65g 15/14, 19/20

ABSTRACT OF THE DISCLOSURE

Conveyor systems for use in processing printed circuit boards through automatic soldering operations. At least one side of a conveyor track is spring loaded applying a lateral force that positively grips the printed circuit boards on the conveyors.

This invention relates to conveyor systems and more particularly to such systems used in conjunction with automatic soldering equipment.

The advent of mass production techniques has resulted in a continuous and parallel improvement in material handling equipment. Since the inception of mass production the material to be processed has been brought to the technicians rather than the technicians to the materials. More recently, automation techniques have been combined with mass production techniques whereby many tasks formerly performed by technicians are now accomplished by machines. The utilization of automation techniques has added to the requirements of the material handling equipment employed.

A good example of material handling systems involved in automated mass produced items and problems associated therewith is to be found in the equipment employed to automatically solder electronic subassemblies, such as printed circuit boards. In the relatively recent past, all electronic assemblies were hand soldered. Now, machines, such as those commonly known as "wave solder" machines, are extensively used; especially, when the subassemblies comprise printed circuit boards.

Certain steps in the automatic soldering and cleaning process accomplished by the wave soldering machines require that the printed circuit boards be gripped positively. At the same time it is imperative that a maximum amount of the board surface be exposed at all times. The problem therefore becomes one of devising a conveyor that could positively grip the articles being processed without appreciably diminishing the amount of surface area exposed for processing. At the same time, the gripping device must be automatically actuated and operated without delaying the article being processed.

Prior art material handling means employed relatively complicated gripping devices or especially designed carriers to be used in conjunction with the machines automatically processing the work pieces. For example, wave soldering machines often employed special printed circuit board carriers which positively attached the boards to the machine conveyor. This type of carrier required two extra work steps; in that, the printed circuit boards had to be manually loaded onto the carriers and manually unloaded from the carriers. In addition, the carriers had to be frequently replaced leading to expensive machine down time.

Another attempt at a solution was to equip the conveyor itself with complicated clamping arrangements to enable the conveyor to positively grip the boards. The positive grip is essential, for example, to enable the machines to automatically brush clean the soldered boards without displacing the boards from the conveyor. These arrangements also either required manual loading and unloading or proved unduly complicated and expensive.

The complicated arrangements, for example, required frequent repairs, hence, resulted in annoying and expensive down time.

Accordingly, an object of the present invention is to provide conveyor systems that automatically and positively grip the carried articles in uncomplicated and inexpensive manner.

A related object of the invention is to provide conveyor arrangements wherein conveyed articles are automatically transferred from a first conveyor to a second conveyor. The articles merely rest on the first conveyor but are positively gripped on the second conveyor. The grip enables the conveyed articles to be processed in a manner which exerts a displacing force on the articles. The positive grip of the conveyor system prevents the displacement of the articles.

A further object of the invention is to provide carrier equipment for printed circuit boards wherein the carrier equipment positively grips the boards without diminishing or otherwise interferring with the board's exposed surface area.

According to one aspect of the invention the inventive conveyor arrangement comprises a pair of parallel disposed conveyor rails. The rails each carry a conveyor chain peripherally encircling the rails. Article carrying attachment links or studs on the chains project transversely from the chains so that the attachment links of one rail are disposed toward the attachment links of the opposite parallel rail when the chains are on the inside of the rails. At least one of the rails is provided with an adjustable back-up bar that can be moved to provide a lateral force which grips the articles being transferred by trapping them between the conveyor chains. Thus, the articles are gripped in an inexpensive and uncomplicated manner which neither interferes with nor diminishes the exposed surface of the carried articles.

The above enumerated and other objects and features of this invention and the manner of obtaining them will become more apparent, and the invention itself will be best understood by reference to the following description of an embodiment of the invention taken in conjunction with the accompanying drawings, in which.

Figure 3:
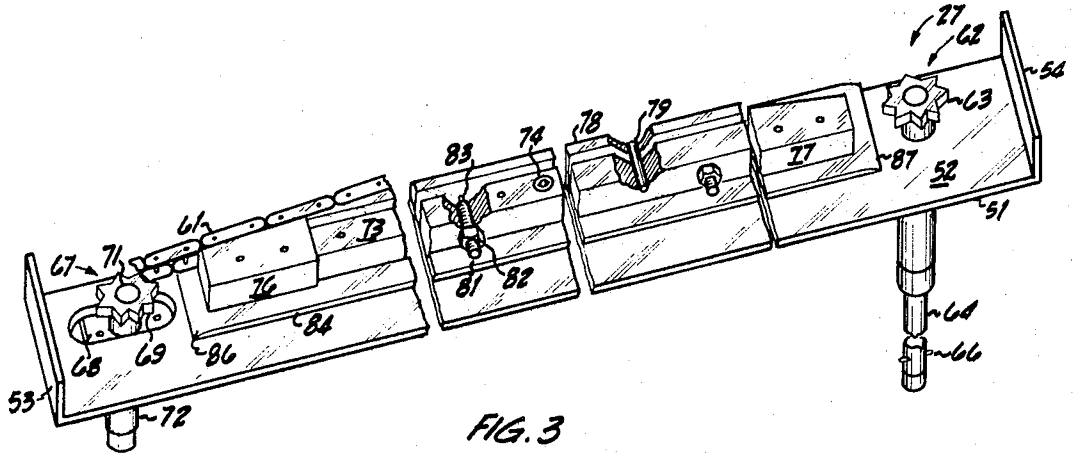
FIG. 3 is a pictorial assembly view of an inventive conveyor rail with the top cover removed.
Figure 3A:
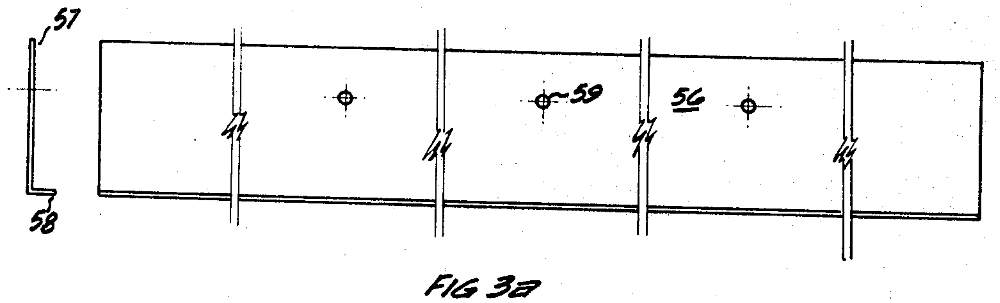
Figures 4, 4A:
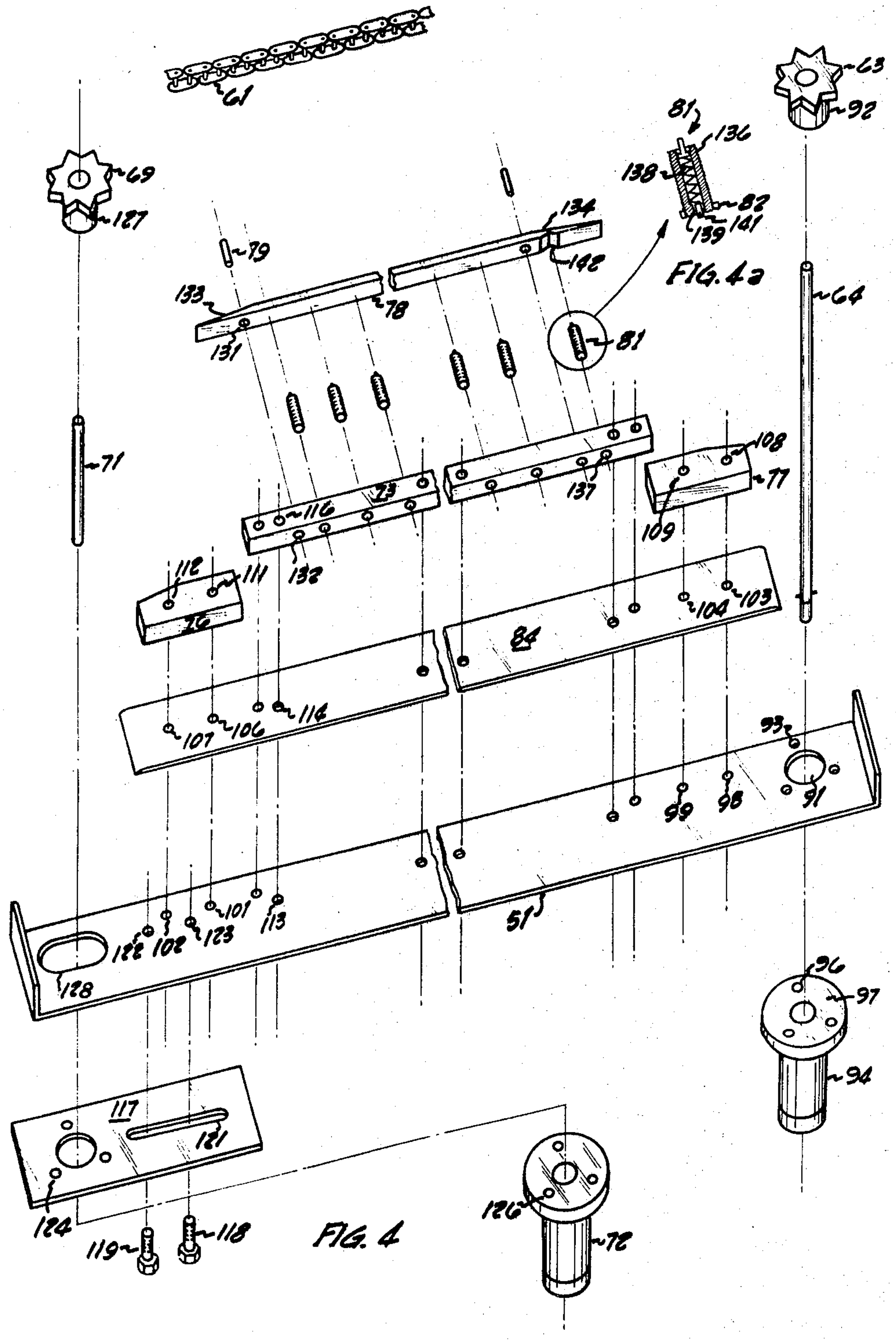

FIG. 3*a* shows the removed top cover;

FIG. 4 is an exploded pictorial view of the conveyor rail of FIG. 3; and

FIG. 4*a* is a cross sectional view of a spring loaded plunger used in the conveyor rail of FIG. 4.

Figure 1:
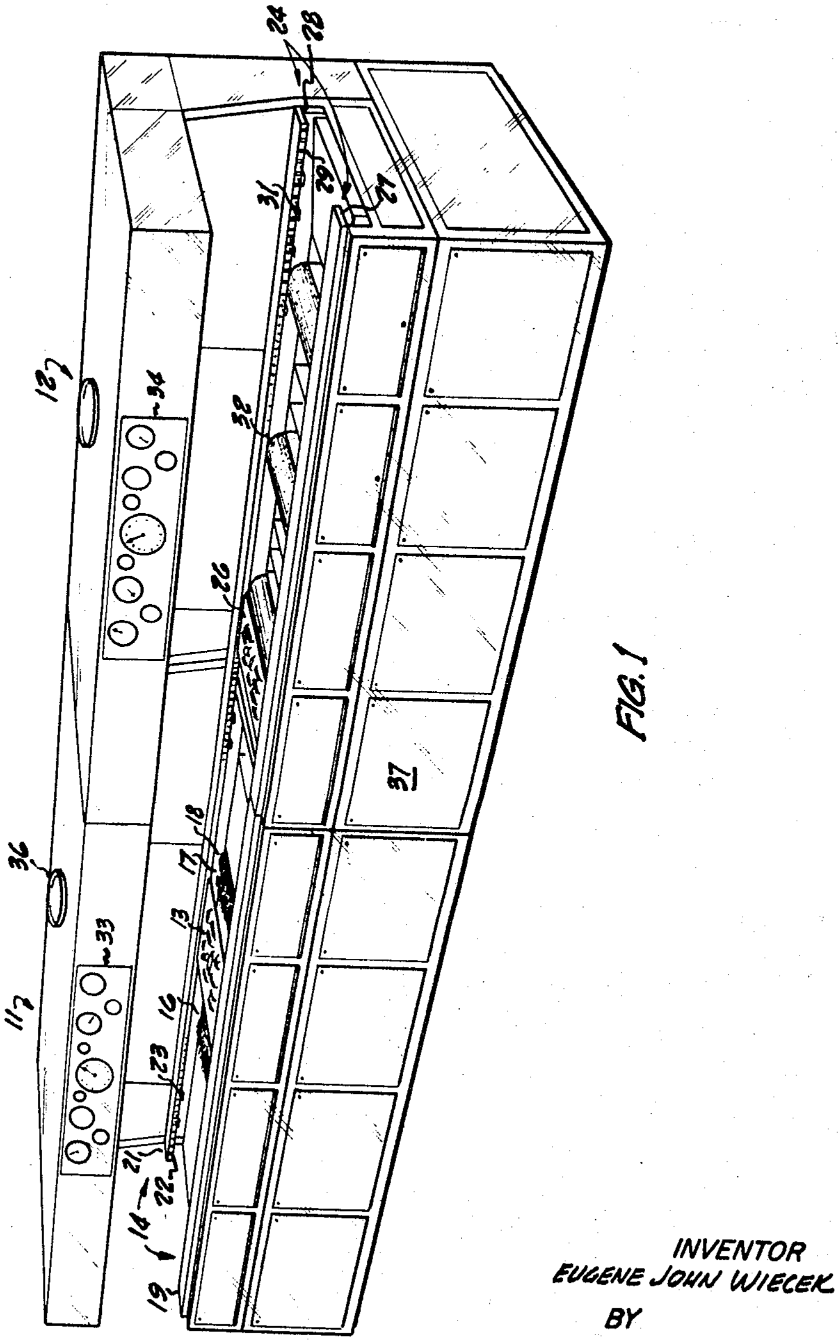
FIG. 1 is a pictorial view of an automatic soldering installation using the inventive conveyor system.

FIG. 1 shows a typical modern automatic soldering installation comprising an automatic wave-soldering machine 11 and a companion automatic cleaning machine 12. It should be understood that while the illustrated installation advantageously emphasizes the advantages inherent in the inventive conveyor arrangement; the said arrangement is not limited to use on such installations. Instead, the inventive arrangement is ideally suited wherever it is necessary to positively grip the articles being carried without interferring with the exposed surface areas.

A typical printed circuit board 13 is symbolically shown riding on the conveyor system 14 on the wave soldering machine 11.

The wave soldering machine typically is equipped to apply solder flux to the boards 13 as they ride on conveyor 14 past station 16. At station 17, a dual wave 18 of molten solder is generated by pumps (not shown). The underside of the boards riding on the conveyor 14 pass through the crest of the solder waves and thus are automatically soldered.

Neither the application of flux, nor the application of solder applies a sufficient upward force to displace the boards. Thus, there is no necessity of gripping the boards on the wave soldering machine. The conveyor system 14 of wave-soldering machine 11 thus typically comprises a pair of equivalent parallel disposed spaced apart conveyor rails 19, 21. As best seen with respect to rail 21 each of the rails has associated therewith a conveyor chain, such as chain 22 which longitudinally extends the complete length of the rails.

Means are provided for carrying the printed circuit boards. More specifically, attachment links or studs, such as stud 23, are attached (in any well known manner) to the chains at frequent and regular intervals. The studs extend toward the chain on the opposite conveyor rail. The studs typically have flat surfaces designed to receive the boards thereon and to extend only a minimum distance beyond the outer periphery of the board. Thus, on the wave-solder machine, the boards ride on the studs 23 carried by the chains 22. The chains 22 are not in a contiguous relationship with the boards. Neither clamps nor pins are used to retain the boards on the carrier.

When the board reaches the end of conveyor 14 it is automatically transferred to the conveyor 24 of cleaning machine 12. In FIG. 1 printed circuit board 26 is shown on conveyor 24. The conveyor comprises spaced apart and parallel disposed conveyor rails 27, 28. The rails each are equipped with a continuous chain such as chain 29 which longitudinally extends almost the length of the rails. The chains have fastened hereto at regular intervals attachment links or studs 31 which are flattened to receive the boards thereon and project toward the opposite conveyor rail. The transfer from conveyor 14 to conveyor 24 is accomplished when the board reaches the end of conveyor 14 and extends onto the studs of conveyor 24. The transfer is aided by the positive grip of conveyor 24.

The boards such as board 26, are carried by conveyor system 24 over rotating brushes, such as brush 32. The brushes scour the underside of the boards as the boards pass thereover to clean the excess flux and solder from the boards. In rubbing against the boards the brushes exert a displacing force on the boards. Unless the boards are positively gripped they would be forced from the conveyor. Thus, means associated with conveyor 24 are provided for laterally gripping the boards to retain them on the conveyor during the cleaning process.

Each of the machines 11, 12 are equipped with control equipment, shown in this exemplary figure at console locations 33, 34 respectively. The machines are also equipped with internal ventilating equipment as shown, for example, by duct entrance 36 on machine 11. Easily removable panels such as panel 37, provides ready access to actuating and drive equipment such as pumps, motors and the like.

The machine 12 of FIG. 1 thus requires a conveyor system that is capable of amenably receiving work pieces from a first conveyor and automatically positively gripping the piece parts without complicated clamps, pins or other mechanisms that would interfere with the exposed surface area. Such equipment is shown and disclosed in detail in the description of the drawings following herein.

Figure 2:
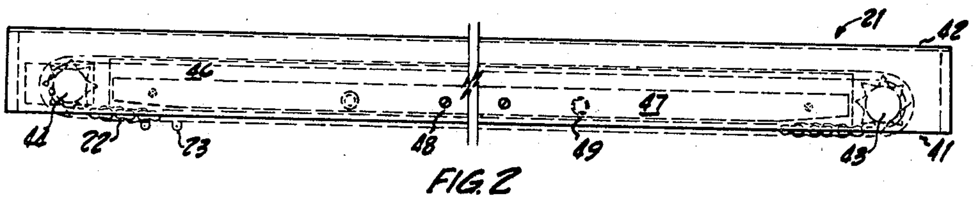
FIG. 2 is a top view of a conveyor rail.

FIG. 2 shows the conveyor rails that are used on the machines such as machine 11, when it is not necessary to positively grip the piece part but it is necessary to assure that a maximum surface area of the carried article, piece part, or in this example, printed circuit board is exposed for automatic processing, i.e. herein soldering. Thus, the conveyor rail of FIG. 2 could be rail 21 of FIG. 1.

The rail 21 comprises a base for all of the components that make up the rail. The base is provided by means such as channel 41. The entire rail is covered by an L-shaped sheet metal cover 42. The cover acts to isolate and protect the chain and sprocket components. That is, it prevents foreign matter from falling onto the chain and sprocket assembly of the conveyor and at the same time prevents people from inadvertently becoming entangled in the conveyor chain and sprocket assembly.

The conveyor rail 21 further comprises means such as drive sprocket assembly 43. The sprocket is driven in any well known manner by a motor. It is coupled to the motor in a manner well known to those skilled in the art such that the conveyor chain travels at a desired speed. The speed of the chain could be adjusted within certain limits by controls in the aforementioned control consoles, such as console 33.

When the drive sprocket 43 rotates, the endless chain moves driving the idler or tightener sprocket 44. The tightener sprocket 44 is slot mounted to enable its adjustable horizontal movement towards and away from the drive sprocket 43 to loosen or tighten the endless chain 22 as required.

A bearing plate 46 is provided upon which the bottom of the endless chain abuts. The bearing plate acts to minimize friction and consequently undue wear on the endless chain 22.

A back-up bar 46 is juxtaposed to the inside track of the endless chain 22. The back-up bar 46 acts to strip the chain from the sprockets to assure smooth movement of the chain. Also, as its name implies, the back-up bar 46 backs up the chain and among other things, prevents the chain from being forced outward by piece parts.

The cover 42 is held in place by any well known fastening means such as threaded fasteners which may be slotted screws, such as shown at 48, which thread into threaded holes in the back-up bar 47. The back-up bar 47 and bearing plate 46 are fastened to the channel 41 by any well known fasteners such as allen head screws or bolts 49 which pass through holes in the back-up bar and the bearing plate and screw into threaded holes in the channel 41. The screws 49 are counter sunk within the bar 47 to avoid interference with the cover 42.

Where it is necessary to positively grip the device being carried at least one of the conveyor rails must be equipped to exert a lateral force on the piece parts being carried. Thus, the bar 27 on machine 12 is so equipped and is illustrated in FIG. 3.

The conveyor rail 27 comprises a channel 51 which serves as the base for the rail. The channel is made of a wide horizontal body section 52 terminated at either side by vertical sections 53, 54. A cover 56 shown in FIG. 3*a* normally rests on and extends between vertical sections 53, 54. The cover has an L-shaped cross section comprise of horizontal section 57 and vertical section 58. The cover 56 in its normal position on the channel 51 defines a rectangularly closed volume open only toward the inside of the conveyor system. Thus, here again the cover protects the conveyor and people in the operating area of the conveyor. Holes, such as hole 59, enables the passage of fastening devices, such as threaded screws for fixedly assemblying the cover 56 into place over the channel 51.

The conveyor rail 27 is equipped with article moving or carrier means, such as endless chain 61 which extends almost the entire length of the rail. The chain 61 has attached thereto studs (not shown) such as the studs 23 shown in FIG. 2. The piece parts, in this example the printed circuit boards, are carried on the studs.

Means, such as drive sprocket assembly 62 are used to drive the endless chain during the operation of the conveyor system 24. The sprocket assembly comprises a sprocket wheel 63 which has teeth designed to mesh with the sprocket spaces on the endless chain 61. The sprocket wheel 63 is mounted on a drive shaft 64. The drive shaft 64 is coupled to a motor through means such as clevis (not shown) utilizing pin 66. The method of coupling the drive sprocket to the motor is shown merely by way of example. It is not intended that this invention be limited to the aforementioned clevis arrangement.

An idler or tightener sprocket assembly 67 is provided which is mounted to a chain tightener assembly 68 that is slot mounted to facilitate its movement away from or toward the drive sprocket assembly 62 thus enabling the tightening or loosening of the endless chain 61. The idler sprocket assembly further comprises a sprocket wheel 69 designed to mesh with chain 61 and mounted on shaft 71. The shaft passes through stationary bushing 72 and is fixed in a bearing housing in any well known manner.

Means are provided in conveyor rail 27 for exerting a lateral force on the articles being transported by the conveyor system. In greater detail, the conveyor rail 27 is provided with the usual conveyor back-up bar 73 that is fixedly attached to the channel 51 by means such as counter sunk screw 74 which is threaded into a threaded hole in the channel 51 after passing through a hole in the bar 73. The screw 74 is shown in the exemplary drawing as having an allen head.

At each end of the fixed back-up bar is shown bias cut end blocks 76, 77 which are fixed to the base channel 51 with threaded fasteners in a manner which may be similar to that shown for the fixed back-up bar. The bias cut end blocks 76, 77 act to strip the chain from the sprocket and to provide a funnel like entrance and exit to the conveyor 24. That is, the endless chain 61 abuts the bias portion of the blocks 76 and 77 at the entrance and exit to the conveyor system respectively. This causes the chain to be bowed into the inside of the conveyor system 24. The funnel like entrance and exit facilitate the transfer of piece parts i.e. printed circuit boards, from and to other conveyor systems, such as system 14 for example.

Means, such as adjustable back-up bar 78 are provided to make it possible to adjust and vary the distance between the endless chains on the opposite conveyor rails. Thus, adjustable back-up bar 78 makes it possible to vary the distance between the endless chain 29 on rail 28 and the endless chain 61 on rail 27 of conveyor system 24.

In greater detail, the adjustable back-up bar 78 is equipped with roll pins such as roll pin 79, which is exemplarily press fitted into bar 78 and slip-fitted into a hole in bar 73. The pins assure that the adjustable bar 78 does not cock unduly when its position is adjusted to vary the distance between conveyor rail assemblies on the opposite sides of the conveyor.

Means, such as plunger 81, are provided for positioning adjustable bar 78. The plungers such as plunger 81, are screwed into threaded holes in the fixed bar 73 until the nut 82 abuts the outside of the bar 76 at which time the tip 83 will be pressed against the adjustable bar 78 forcing that bar against chain 71 causing the chain to bow inwardly a desired amount.

Means are provided for resiliently positioning the adjustable bar 78. This is accomplished by spring-loading the tips 83 of plungers 81. When the adjustable bars are spring loaded, then the distance between the chains on opposite sides of the conveyor is made smaller than the piece parts transported by the conveyor. Therefore, the conveyor chains will exert a resilient lateral force on the piece parts, such as printed circuit boards, and hence, assure that the boards are not displaced by forces exerted on them during their automatic processing while on the conveyor.

The rail assembly 27 is further provided with a bearing plate 84. The bearing plate provides a friction minimization surface on which the endless chain 61 can ride during operation of the conveyor. The plate 84 is rounded at its leading and trailing edges 86, 87 respectively to prevent the chain 61 from "catching" or "hanging up" on the ends thereof.

Thus, as the chain 61 is driven around the back-up bar assembly it is forced into a bowed position wherein it exerts a lateral force on the printed circuit boards being transported by the conveyor. That is, the boards are pressed between the endless chains. The resiliency of the pressure means helps to assure that the boards are not damaged. It is readily apparent that both or only one of the conveyor rails used in system 24 can be equipped with adjustable bars 78 and with the resilient plungers 81. When the adjustable bars are used, the lateral force is applied to the printed circuit boards. The plungers 81 assure that the lateral force is readily adjustable to provide a wide range of applications for the inventive conveyor system illustrated herein in conjunction with automatic soldering equipment.

FIG. 4 shows the inventive conveyor rail in greater detail. The base channel 51 is shown having an aperture 91. The aperture receives the yoke section 92 of sprocket wheel 63. Three holes such as hole 93, are used in fastening bushing 94 to the bottom of channel 51. The drive shaft 64 passes through the bushing 94. Three holes, such as hole 96 on bushing flange 97 align with holes such as hole 93, to fasten the bushing to the channel. The sprocket wheel 63 can be attached or keyed to shaft 64 in any well known manner.

Holes 98, 99 and 101, 102 in channel 51 and holes 103, 104 and 106, 107 in bearing plate 8 are used for fastening end blocks 76, 77 using well known threaded fasteners which go through those holes and thread into threaded holes, such as holes 108, 109 and 111, 112 in the blocks 77 and 76 respectively. Other holes such as holes 113, in channel 51 and 114 in plate 84 are used in conjunction with holes, such as hole 114 in fixed block 76 for mounting the bar to the channel.

The chain tightener plate 117 of assembly 68 is mounted to channel 61 using threaded fasteners 118, 119. The fasteners pass through slot 121 in the plate 117 and are tightened by threading the fasteners into threaded holes in channel 51. The plate 117 is locked in place when the threaded fasteners a securely threaded into the aforementioned threaded holes.

The plate 117 is equipped to secure bushing 72 by using threaded fasteners through holes, such as hole 124 and threading them into an aligned threaded hole, such as hole 126. A yoke section 127 on idler sprocket wheel 69 passes through slot 128 located in channel 51.

The tension on the continuous chain is readily adjusted by loosening the fasteners 118, 119. The plate 117 is moved toward the drive sprocket to loosen the tension on the chain 61 or away from the drive sprocket assembly 62 to increase the tension on chain 61. The plate 117 moves through the distance of the slot 121 while the idler sprocket attached to the plate moves within slot 128. When the tension on the chain 51 is adjusted to whatever tension is desired, the fasteners 118, 119 are tightened to lock the plate 117 in place.

The adjustable back-up bar 78 is shown equipped with pins, such as the roll pin 79 which are press fitted into holes in the adjustable bar, such as hole 131 and slip fitted into holes such as hole 132 in the fixed back-up bar 73.

A plurality of spring loaded plungers, such as plunger 81 are used to resiliently adjust the location of the adjustable back-up bar 78. It should be noted that the adjustable back-up bar 78 is biased at the leading and trailing ends 133 and 134 thus implementing the funnel like bow in arrangement of chain 61 provided by end blocks 76, 77. The adjustable back-up bar thus is imprisoned between the spring-loaded plungers and the chain.

Details of the spring loaded plunger 81 are best seen in FIG. 4(*a*) which is a cross sectional view thereof. Therein the plunger is shown as' having an outside thread 136. The outside thread is used in threading the plunger into threaded holes, such as hole 137 in bar 73. The depth of penetration of plunger 81 into hole 137 is selectively and adjustably limited by nut 82 also threaded onto thread 136. The plunger is equipped with a tip 83 which is resiliently loaded with spring 138 inside the bore of plunger 81. A screw-like element 139 which screws into internal thread 141 may be used to adjust the spring bias of spring 138.

The adjustable bar 78 may have "V" notches, such as notch 142 where the point of plunger 81 abuts the bar to prevent slipping of the bar when pressed by the plungers. The notch increases the efficacy of the plungers.

In operation, the soldering equipment 11, 12 is turned on. The components such as resistors, capacitors, transistors, etc. are mounted on the boards. The boards are then set on the studs 23 of conveyor system 14. While carried on conveyor system 14, the printed circuit boards have flux applied thereto and subsequently are passed through a solder wave. The funnel like arrangement at entrance and exit of the conveyor arrangement 14 facilitates the loading and unloading of the conveyor. The operations performed on the boards by machine 11 do not exert any displacing force on the boards, hence it is not necessary that any force be exerted on the boards to retain them in the conveyor. The boards on convyeor 14 merely rest on studs 23 and are carried to the conveyor arrangement 24 of machine 12.

As the board enters the funnel like entrance way of conveyor system 24 it is gripped by the resiliently displaceable chain 61 pressing the board against chain 29. The lateral force exerted on the boards in system 24 stems from the pressure of the spring loaded plungers such as plunger 81 on adjustable back-up bar 78. The back-up bar is juxtaposed contiguous to the continuous chain 61 and forces that chain to bow toward chain 29. Hence, the board is positively gripped which enables it to withstand the displacing force exerted on it by the brushes such as brush 32, during the cleaning process. The boards after cleaning pass automatically onto another conveyor for final inspection and/or packaging.

Thus, the disclosed conveyor system automatically transfers the boards from a system that does not grip the boards to one that does grip them. The boards are automatically gripped by a laterally applied force that holds them securely without interferring in any way with the exposed surface area requiring processing. The system is also unique in that no complicated clamps or pin arrangements are used.

What is claimed is:

1. A conveyor system for transporting articles for processing, said system comprising a pair of parallel disposed spaced apart conveyor rails, each of said rails comprising an endless chain traveling along the length of said rail, means on each of said chains cooperating with similar means on the other of said chains to support said articles, force exerting means comprising adjustable back-up bar means contiguously associated with said chain on at least one of said rails, location varying means for varying the location of said adjustable back-up bar means, whereby the distance between said chains is adjustable so that said chains exert a gripping force on said articles, said location varying means including fixed back-up bar means located on the at least one of said rails, said fixed back-up bar means being juxtaposed and parallel to said adjustable back-up bar means, whereby said back-up bar means are surrounded by said continuous chain, plunger means attached to said fixed back-up bar means to extend toward and abut against said adjustable back-up bar means, and means on said plunger means for varying the length said plunger means extends towards said adjustable back-up bar means thereby varying the distance between said fixed back-up bar means and said adjustable back-up bar means.

2. The conveyor system of claim 1 wherein said plunger means includes spring loaded plunger means.

3. The conveyor system of claim 2 wherein said spring loaded plunger means is threaded into said fixed back-up bar to extend normal to and abut said adjustable back-up bar and wherein said spring loaded plunger includes spring-bias adjusting means.

4. The conveyor system of claim 3 wherein said continuous chain comprises attachment links integrally mounted to said chain, wherein said links extend normal to said chain and wherein said links have a flattened portion for extending slightly beyond the contiguous periphery of said articles whereby said articles are supported by links on opposite continuous chains.

5. The conveyor system of claim 4 wherein said oppositely disposed conveyor rail means form a funnel like arrangement.

6. The conveyor system of claim 5 wherein said funnel like arrangement comprises bias-cuts on said adjustable back-up bar means.

7. The conveyor system of claim 6 wherein pin means are cooperatively associated with said adjustable and fixed back-up bar means for keeping said adjustable back-up bar means parallel to said fixed back-up bar means, and wherein said adjustable back-up bar means is equipped with notch means for receiving said abutting plunger means.

References Cited

UNITED STATES PATENTS

| | | | |
|---|---|---|---|
| 741,907 | 10/1903 | Hatfield | 198—162 X |
| 2,546,476 | 3/1951 | Schefe | 198—162 X |
| 3,108,682 | 10/1963 | Zipper | 198—162 |

EDWARD A. SROKA, *Primary Examiner.*

U.S. Cl. X.R.

198—162